US009171337B2

(12) United States Patent
Fisher et al.

(10) Patent No.: US 9,171,337 B2
(45) Date of Patent: Oct. 27, 2015

(54) SYSTEM AND METHOD FOR MONITORING SOCIAL NETWORK CONVERSATIONS

(75) Inventors: Charles W. Fisher, Boston, MA (US); Pace G. Willisson, Medway, MA (US)

(73) Assignee: aPebble, LLC, Boston, MA (US)

( * ) Notice: Subject to any disclaimer, the term of this patent is extended or adjusted under 35 U.S.C. 154(b) by 120 days.

(21) Appl. No.: 13/370,916

(22) Filed: Feb. 10, 2012

(65) Prior Publication Data

US 2013/0212172 A1 Aug. 15, 2013

(51) Int. Cl.
*G06F 15/16* (2006.01)
*G06Q 50/00* (2012.01)

(52) U.S. Cl.
CPC .................................... *G06Q 50/01* (2013.01)

(58) Field of Classification Search
CPC . H04L 12/588; H04L 12/2418; H04L 41/026; H04L 41/5093; H04L 45/123; H04L 51/00; H04L 65/4007; G06Q 30/0214; G06Q 30/02; G06Q 30/0222; G06Q 30/0601; G06Q 30/0641; G06Q 20/202; G06Q 30/0209; G06Q 30/0224; G06Q 30/0226; G06Q 30/0233; G06Q 30/0239; G06Q 30/0241; G06Q 30/0246; G06Q 30/0277; G06Q 40/08; B42D 15/10
USPC .......................................................... 709/204
See application file for complete search history.

(56) References Cited

U.S. PATENT DOCUMENTS

| | | | | |
|---|---|---|---|---|
| 7,720,835 | B2 * | 5/2010 | Ward et al. | 707/710 |
| 7,912,897 | B2 * | 3/2011 | Grossman | 709/203 |
| 7,974,983 | B2 * | 7/2011 | Goeldi | 707/769 |
| 8,151,194 | B1 * | 4/2012 | Chan et al. | 715/716 |
| 2004/0111479 | A1 * | 6/2004 | Borden et al. | 709/206 |
| 2007/0214097 | A1 * | 9/2007 | Parsons et al. | 706/12 |
| 2007/0219871 | A1 * | 9/2007 | Rolf et al. | 705/26 |
| 2008/0155588 | A1 * | 6/2008 | Roberts et al. | 725/34 |
| 2010/0058188 | A1 * | 3/2010 | Shah et al. | 715/734 |
| 2010/0241576 | A1 * | 9/2010 | Beeri | 705/80 |
| 2011/0178793 | A1 * | 7/2011 | Giffin et al. | 704/9 |
| 2011/0184792 | A1 * | 7/2011 | Butcher et al. | 705/14.13 |
| 2011/0231240 | A1 * | 9/2011 | Schoen et al. | 705/14.41 |
| 2011/0276396 | A1 * | 11/2011 | Rathod | 705/14.49 |
| 2012/0131112 | A1 * | 5/2012 | Yehaskel | 709/206 |
| 2012/0265806 | A1 * | 10/2012 | Blanchflower et al. | 709/204 |
| 2012/0284108 | A1 * | 11/2012 | Fontana et al. | 705/14.27 |
| 2012/0296718 | A1 * | 11/2012 | Kennedy et al. | 705/14.16 |
| 2012/0324008 | A1 * | 12/2012 | Werz et al. | 709/204 |
| 2013/0013326 | A1 * | 1/2013 | Miller et al. | 705/1.1 |
| 2014/0164398 | A1 * | 6/2014 | Smith et al. | 707/748 |
| 2014/0237052 | A1 * | 8/2014 | Odio et al. | 709/204 |
| 2014/0258410 | A1 * | 9/2014 | Sittig et al. | 709/204 |

* cited by examiner

*Primary Examiner* — Kevin Bates
*Assistant Examiner* — Ronak Patel
(74) *Attorney, Agent, or Firm* — Brian J. Colandreo; Michael T. Abramson; Holland & Knight LLP

(57) ABSTRACT

A method, computer program product, and computer system for providing, using a processor of a computer, at least a portion of text that includes a link for use by a website. A plurality of posts associated with an online social network is monitored using the processor of the computer to determine whether the link is present in at least one post of the plurality of posts. A first user of the online social network that has the link included in the at least one post is identified using the processor of the computer, where the at least one post of the first user identifies a second user of the online social network. Information associated with the first user is recorded in a data store using the processor of the computer in response to identifying that the first user has the link posted in the at least one post.

18 Claims, 4 Drawing Sheets

SYSTEM AND METHOD FOR MONITORING SOCIAL NETWORK CONVERSATIONS

TECHNICAL FIELD

This disclosure relates to monitoring systems and methods and, more particularly, to monitoring social network systems and methods.

BACKGROUND

Online social networking sites, such as LinkedIn, Facebook, Twitter, MySpace, etc., are collectively used by a vast number of users throughout the world. These sites enable their users to, for example, maintain relationships, promote businesses, as well as promote their opinions on various topics.

One such topic may involve politics. For example, some users of social networking sites may host discussions or comment on numerous political causes, as well as individual politicians themselves. Because such discussions and comments may be seen by certain members of the social networking site and/or by other members of the public, information may be readily disseminated to the politically active and enabling both sides of the issue to be heard.

However, the extent of political awareness and involvement may vary greatly between individual users. For example, some users may post and comment about multiple political issues, while other users may have an opinion on the topic but may not have the time or desire to put forth the effort to follow and participate in the discussion. As such, there remains a need for a more convenient way to encourage more users to follow and contribute to the political discourse.

SUMMARY OF DISCLOSURE

In one implementation, a method for conversation monitoring, performed by one or more computing devices, comprises providing, using a processor of a computer, at least a portion of text that includes a link for use by a website. A plurality of posts associated with a second website is monitored using the processor of the computer to determine whether the link is present in at least one post of the plurality of posts. A first user of the second website that has the link included in the at least one post is identified using the processor of the computer. Information associated with the first user is recorded in a data store using the processor of the computer in response to identifying that the first user has the link posted in the at least one post.

One or more of the following features may be included. Identifying the first user may include monitoring an associated second website profile of the first user. An associated second website profile of a second user identified by the at least one post of the first user may be monitored using the processor of the computer. A posting of the second user responding to the at least one post of the first user may be identified at the computer. Identifying the posting of the second user responding to the at least one post of the first user may include receiving at the computer the posting of the second user responding to the at least one post of the first user. The at least one post of the first user and the posting of the second user responding to the at least one post of the first user may be organized using the processor of the computer. The organized at least one post of the first user and the posting of the second user responding to the at least one post of the first user may be provided for display by the website using the processor of the computer. The link may be a shortened Uniform Resource Locator (URL).

In another implementation, a computer program product resides on a computer readable medium that has a plurality of instructions stored on it. When executed by a processor of a computer, the instructions cause the processor to perform operations comprising providing, using the processor of the computer, at least a portion of text that includes a link for use by a website. A plurality of posts associated with a second website is monitored using the processor of the computer to determine whether the link is present in at least one post of the plurality of posts. A first user of the second website that has the link included in the at least one post is identified using the processor of the computer. Information associated with the first user is recorded in a data store using the processor of the computer in response to identifying that the first user has the link posted in the at least one post.

One or more of the following features may be included. Identifying the first user may include monitoring an associated second website profile of the first user. An associated second website profile of a second user identified by the at least one post of the first user may be monitored using the processor of the computer. A posting of the second user responding to the at least one post of the first user may be identified at the computer. Identifying the posting of the second user responding to the at least one post of the first user may include receiving at the computer the posting of the second user responding to the at least one post of the first user. The at least one post of the first user and the posting of the second user responding to the at least one post of the first user may be organized using the processor of the computer. The organized at least one post of the first user and the posting of the second user responding to the at least one post of the first user may be provided for display by the website using the processor of the computer. The link may be a shortened Uniform Resource Locator (URL).

In another implementation, a computing system includes a processor of a computer and memory configured to perform operations comprising providing, using the processor of the computer, at least a portion of text that includes a link for use by a website. A plurality of posts associated with a second website is monitored using the processor of the computer to determine whether the link is present in at least one post of the plurality of posts. A first user of the second website that has the link included in the at least one post is identified using the processor of the computer. Information associated with the first user is recorded in a data store using the processor of the computer in response to identifying that the first user has the link posted in the at least one post.

One or more of the following features may be included. Identifying the first user may include monitoring an associated second website profile of the first user. An associated second website profile of a second user identified by the at least one post of the first user may be monitored using the processor of the computer. A posting of the second user responding to the at least one post of the first user may be identified at the computer. Identifying the posting of the second user responding to the at least one post of the first user may include receiving at the computer the posting of the second user responding to the at least one post of the first user. The at least one post of the first user and the posting of the second user responding to the at least one post of the first user may be organized using the processor of the computer. The organized at least one post of the first user and the posting of the second user responding to the at least one post of the first user may be provided for display by the website using the processor of the computer. The link may be a shortened Uniform Resource Locator (URL).

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

System Overview

Figure 1:
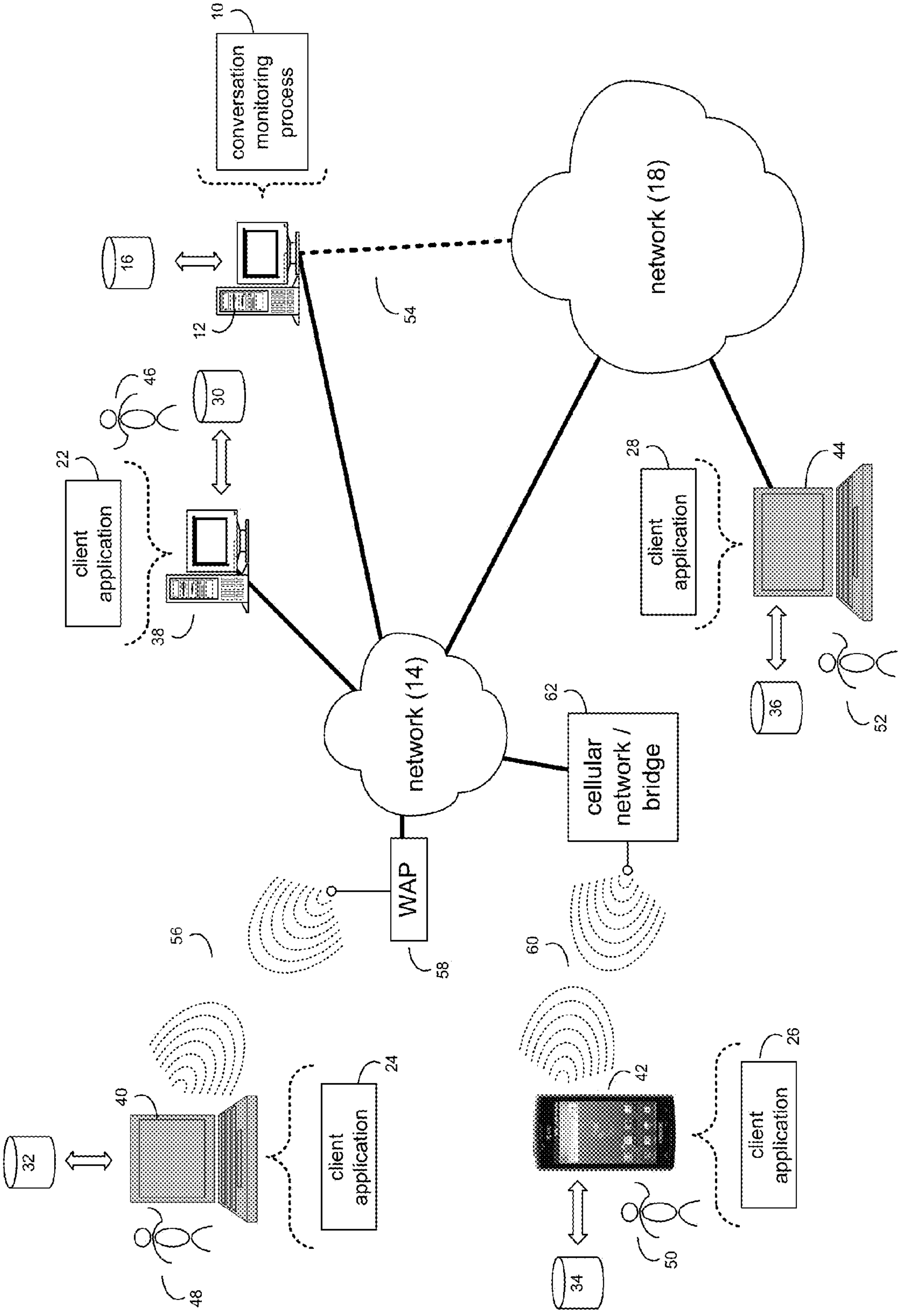
FIG. 1 is an illustrative diagrammatic view of a conversation monitoring process coupled to a distributed computing network.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or combinations thereof.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring to FIG. 1, there is shown conversation monitoring process 10 that may reside on and may be executed by computer 12, which may be connected to network 14 (e.g., the Internet or a local area network). Examples of computer 12 may include but are not limited to a single server computer, a series of server computers, a single personal computer, a series of personal computers, a mini computer, a tablet computer, a mainframe computer, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, conversation monitoring process 10 may provide, using a processor of a computer, at least a portion of text that may include a link for use by a website. A plurality of posts associated with a second website may be monitored using the processor of the computer to determine whether the link is present in at least one post of the plurality of posts. A first user of the second website that has the link included in the at least one post may be identified using the processor of the computer. Information associated with the first user may be recorded in a data store using the processor of the computer in response to identifying that the first user has the link posted in the at least one post.

The instruction sets and subroutines of conversation monitoring process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database) (not shown) and may be located in any suitable memory location, such as within storage device 16 coupled to computer 12. In some embodiments, computer 12 may utilize a database management system such as, but not limited to, "My Structured Query Language" (MySQL) in order to provide multi-user access to one or more databases, such as the above noted relational database. The data store may also be a custom database, such as, for example, a flat file database or an XML database. Any other form(s) of a data storage structure may also be used. Conversation monitoring process 10 may be a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network. Conversation monitoring process 10 may include one or more user interfaces, such as browsers and textual or graphical user interfaces, through which users 46, 48, 50, 52 may access conversation monitoring process 10.

Conversation monitoring process 10 may be accessed via client applications 22, 24, 26, 28. Examples of client applications 22, 24, 26, 28 may include but are not limited to a standard web browser, email client application, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a tablet (not shown), a server (not shown), a data-enabled, cellular telephone (not shown), and a dedicated network device (not shown).

One or more of client applications 22, 24, 26, 28 may be configured to effectuate some or all of the functionality of conversation monitoring process 10. Accordingly, conversation monitoring process 10 may be a purely server-side application, a purely client-side application, or a hybrid server-side/client-side application that is cooperatively executed by one or more of client applications 22, 24, 26, 28 and conversation monitoring process 10.

Users 46, 48, 50, 52 may access computer 12 and conversation monitoring process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth™ device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth™ is a telecommunications industry specification that allows, e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

The Conversation Monitoring Process

Figure 2:
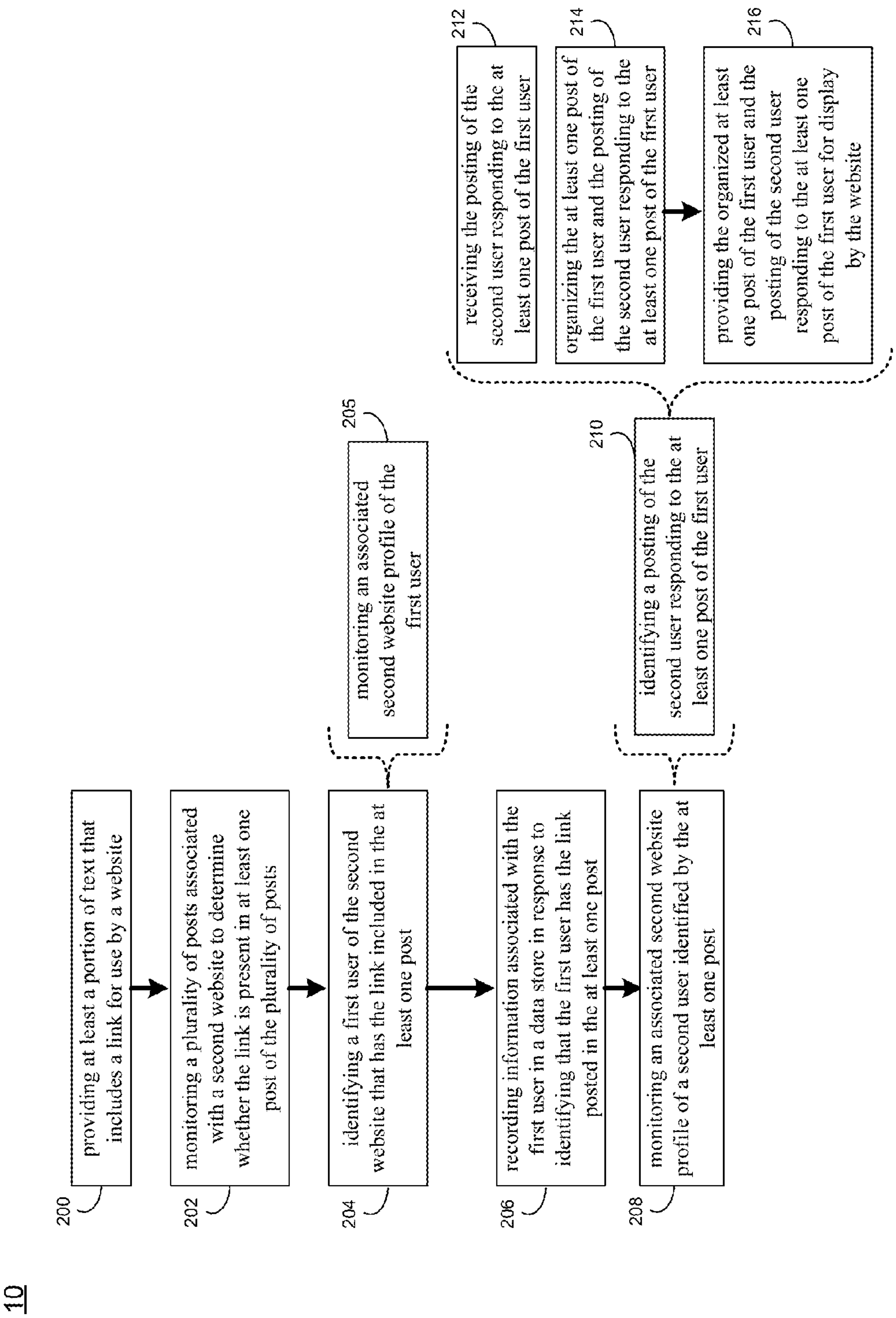
FIG. 2 is an illustrative flowchart of the conversation monitoring process of FIG. 1.
Figure 3:
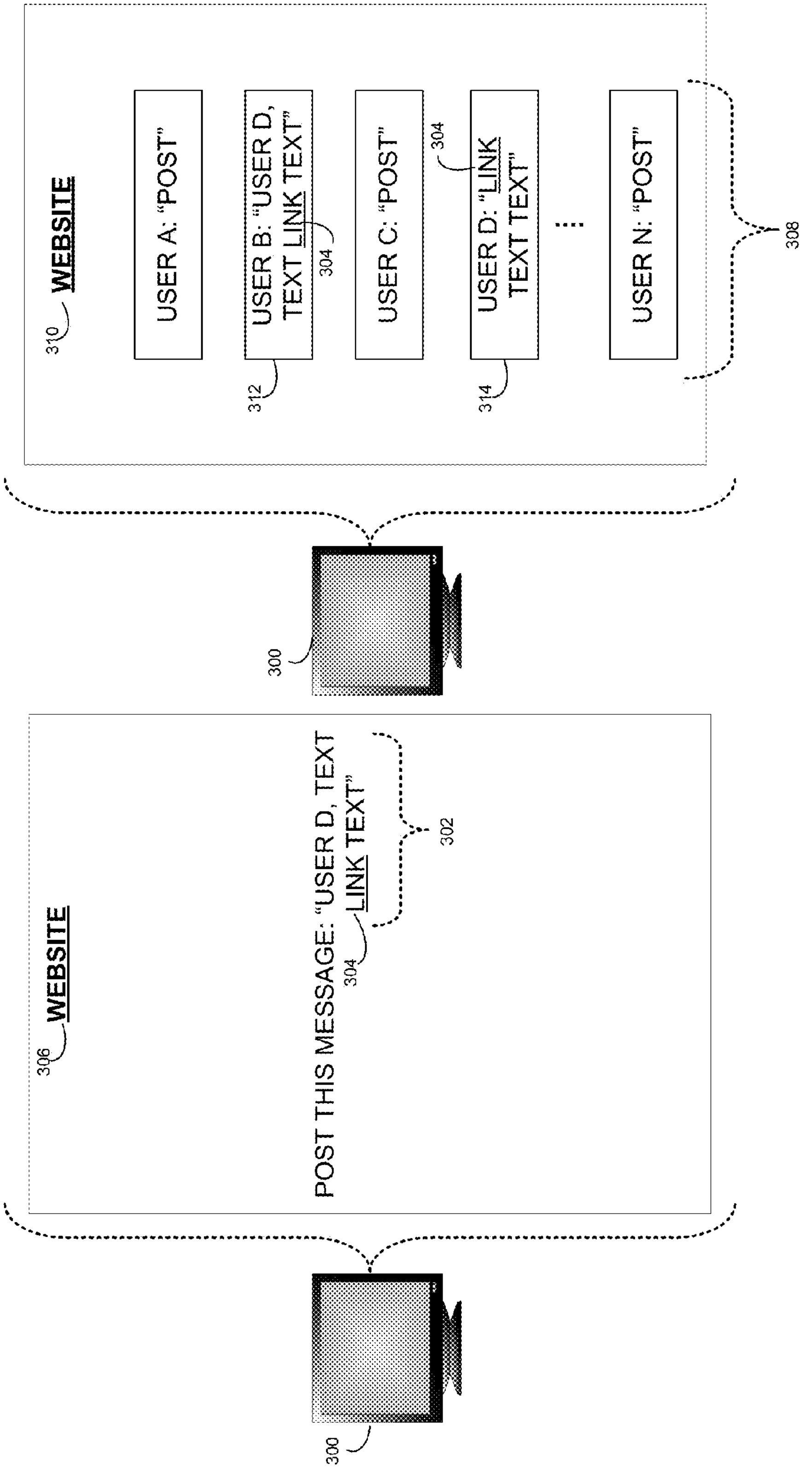
FIG. 3 is an illustrative diagrammatic view of a screen image displayed by the conversation monitoring process of FIG. 1.

As discussed above and referring also to FIGS. 2-4, conversation monitoring process 10 may provide 200, using a processor of a computer (e.g., computer 300), at least a portion of text 302 that may include a link (e.g., link 304) for use by a website (e.g., website 306). For example, text 302 (e.g., "USER D, TEXT LINK TEXT") that may include link 304 may be displayed at website 306. Website 306 may request that its readers, through conversation monitoring process 10, reproduce or otherwise disseminate the contents of text 302, which may include link 304. According to one or more embodiments, dissemination may occur, for example, by text 302 (and link 304) being reproduced (e.g., via a third party application (e.g., "post this message" user interface button at website 306), "cut and paste", etc.) at one or more online posts. However, those skilled in the art will recognize that any method of reproducing text 302 may also be used without departing from the scope of the disclosure. Those skilled in the art will recognize that computer 300 may be, for example, any combination of client electronic devices 38, 40, 42, 44, as well as computer 12.

As will also be appreciated by those skilled in the art, the term "post" may generally be associated with, for example, blog posts, online social networking website posts, etc., however, such an exclusive interpretation is not intended, as other types of interpretations, such as SMS text messages, emails, etc., may also be considered a "post".

A plurality of posts, e.g., posts 308, associated with a second website 310 (e.g., an online social network) may be monitored 202 by conversation monitoring process 10 using the processor of computer 300 to determine whether link 304 is present in at least one post (e.g., post 312) of the plurality of posts 308. Posts 308 may be monitored 202 from, for example, an associated second website user profile page of second website 310, or may be monitored at a public stream/feed of second website 310. For instance, an application programming interface (API) associated with second website 310 may work in combination with conversation monitoring process 10 to search for strings in any public (or private) posts 308 for link 304. Additionally/alternatively, text 302, in part or in whole, may be searched to determine whether link 304 is present in post 312. Additionally/alternatively, in an embodiment where link 304 is not included in text 302, the specific text of text 302 may be what is searched for to determine whether text 302 has been reproduced.

As a result of monitoring 202 posts 308, a first user (e.g., user 46, 48, 50, and/or 52) of second website 310 that has link 304 included in post 312 may be identified 204 by conversation monitoring process 10 using the processor of computer 300. According to one or more embodiments, post 312 of the first user may be used by conversation monitoring process 10 to identify a second user (e.g., user 46, 48, 50, and/or 52) of second website 310. For instance, in the example message "USER D, TEXT LINK TEXT", while USER B (e.g., the first user) may have been the one to post text 302 (via conversation monitoring process 10), USER D may be the identified second user to which text 302 is directed.

Information associated with the first user may be recorded 206 by conversation monitoring process 10 in the above noted data store using the processor of computer 300 in response to conversation monitoring process 10 identifying 204 that the first user has link 304 posted in post 312. For example, the username, handle, or other identification of the first user (e.g., USER B) who posted text 302 may be recorded 206 to maintain a record of each user willing to reproduce text 302 as suggested by website 306. Other information and/or metadata associated with the first user may also be recorded. Such information may be used by conversation monitoring process 10, for example, to monitor 205 an associated second website profile of the first user (e.g., automatically "follow" the first user, e.g., via the profile page and/or future posts of the first user).

Additionally/alternatively, an associated second website profile of the second user identified by post 312 may be monitored 208 by conversation monitoring process 10 using the processor of computer 300 in a similar manner as described above. For example, the second user's profile page (and/or public stream/feed) of website 310 may be monitored to allow conversation monitoring process 10 at computer 300 to identify 210 post 314 of the second user, which may be a direct or indirect response to post 312 of the first user. Such identification 210 of post 314 may be in response to, for example, the second user including link 304 in the response post 314. Post 314, as well as other information about the second user, may also be stored at the above noted data store.

Conversation monitoring process 10 may receive 212 at computer 300 from the data store (or elsewhere) post 314 of the second user responding to post 312 of the first user. Post 312 of the first user and the response post 314 of the second user may be organized 214 by conversation monitoring process 10 using the processor of computer 300. An example of the type of organization may be seen at FIG. 4. For instance, because post 314 of the second user is in response to post 312 of the first user, both posts 312 and 314 may be organized together in order to better convey a conversation taking place. Thus, the organized 400 post 312 of the first user and response post 314 of the second user may be provided 216 by conversation monitoring process 10 for display by website 306 using the processor of computer 300.

Figure 4:
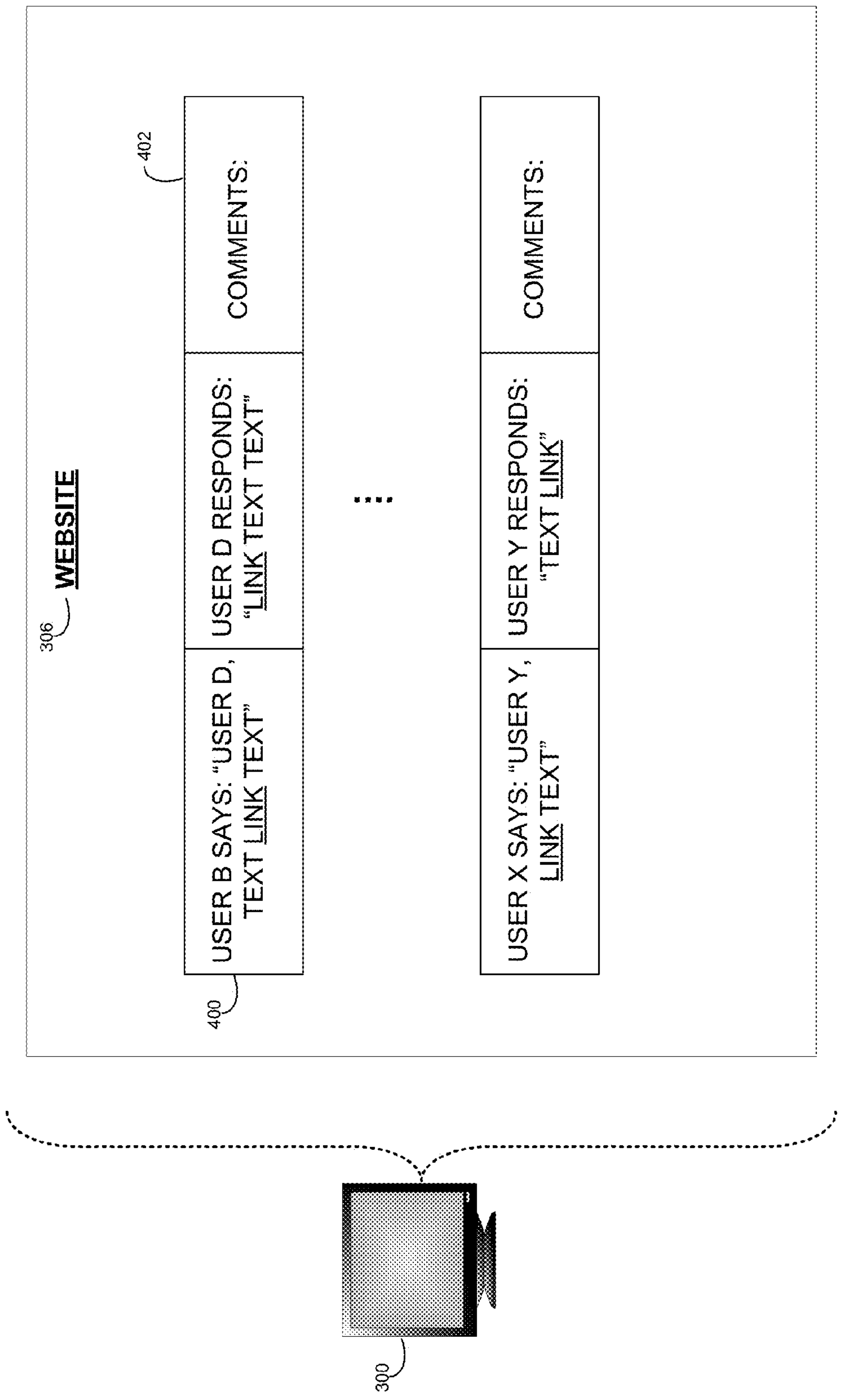
FIG. 4 is an illustrative diagrammatic view of a screen image displayed by the conversation monitoring process of FIG. 1.

While a particular organization and display is illustrated by FIG. 4, those skilled in the art will recognize that other modifications and/or substitutions may be made without departing from the scope of the disclosure. For example, COMMENTS 402 may be provided and organized together with posts 312 and 314 to allow other users to leave their associated comments and opinions pertaining to the organized conversation. As another example, posts 312 and 314 may be provided in a summarized view to recap the essence of the conversation. As such, any particular description or illustration of the organization and/or display of FIG. 4 should be taken as an example only and not to otherwise limit the scope of the disclosure.

Those skilled in the art will appreciate that text 302 need not be limited to the conventional usage of the term, and may include such things as media and images, among other things. Those skilled in the art will also appreciate that link 304 may be a conventional Uniform Resource Locator (URL) as is known in the art, however, link 304 may also be a shortened URL (e.g., bit.ly), hypertext, anchor text/link label/link text (which may or may not be identical to the actual text of the associated URL), as well as any other type of means capable of being monitored and/or searched. Additionally/alternatively, the presence of link 304 need not be visibly apparent in text 302 to the human eye.

It is also contemplated that website 306 may be, for example any type of website (e.g., an online social network website, a blog, etc). Further, while the second website may be generally described as a social networking site (e.g., Facebook, Twitter, etc.), those skilled in the art will recognize that other non-social networking sites, such as blogs, user review sites, etc., may also be used. Additionally/alternatively, website 306 may be a third party website and/or the same website as website 310. As such, the specific description of website 310 being a social networking site and/or a website that is separate from website 306 should be taken as an example only and not to otherwise limit the scope of the disclosure.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations will be apparent to those of ordinary skill in the art without departing from the scope and spirit of the disclosure. The embodiment(s) were chosen and described in order to best explain the principles of the disclosure and the practical application, and to enable others of ordinary skill in the art to understand the disclosure for various embodiment(s) with various modifications and/or any combinations of embodiment(s) as are suited to the particular use contemplated.

Having thus described the disclosure of the present application in detail and by reference to embodiment(s) thereof, it will be apparent that modifications, variations, and any combinations of embodiment(s) are possible without departing from the scope of the disclosure defined in the appended claims.

What is claimed is:

1. A computer-implemented method, comprising:
- providing, using a processor of a computer, at least a portion of text that includes a link for use by a website;
- monitoring, using the processor of the computer, a plurality of posts associated with a second website to determine whether the link is present in at least one post of the plurality of posts;
- identifying, using the processor of the computer, a first user of the second website that has the link included in the at least one post in response to identifying that the first user has the link posted in the at least one post;
- determining, using the processor of the computer, that a second user of the second website is identified in the at least one post of the first user, wherein the second user is identified by name in the at least one post;
- monitoring, using the processor of the computer, an associated second website profile of the second user identified in the at least one post of the first user in response to determining that the second user is identified in the at least one post of the first user; and
- recording, using the processor of the computer, information associated with the first user in a data store in response to identifying that the first user has the link posted in the at least one post, wherein the information includes, at least in part, identification of the first user.

2. The computer-implemented method of claim 1 wherein identifying the first user includes monitoring an associated second website profile of the first user.

3. The computer-implemented method of claim 1 further comprising identifying, at the computer, a posting of the second user responding to the at least one post of the first user.

4. The computer-implemented method of claim 3 wherein identifying the posting of the second user responding to the at least one post of the first user includes receiving, at the computer, the posting of the second user responding to the at least one post of the first user.

5. The computer-implemented method of claim 3 further comprising:
- organizing, using the processor of the computer, the at least one post of the first user and the posting of the second user responding to the at least one post of the first user; and
- providing, using the processor of the computer, the organized at least one post of the first user and the posting of the second user responding to the at least one post of the first user for display by the website.

6. The computer-implemented method of claim 1 wherein the link is a shortened Uniform Resource Locator (URL).

7. A computer program product residing on a non-transitory computer readable medium having a plurality of instructions stored thereon which, when executed by a processor, cause the processor to perform operations comprising:
- providing, using the processor, at least a portion of text that includes a link for use by a website;
- monitoring, using the processor, a plurality of posts associated with a second website to determine whether the link is present in at least one post of the plurality of posts;
- identifying, using the processor, a first user of the second website that has the link included in the at least one post in response to identifying that the first user has the link posted in the at least one post;
- determining, using the processor, that a second user of the second website is identified in the at least one post of the first user, wherein the second user is identified by name in the at least one post;
- monitoring, using the processor, an associated second website profile of the second user identified in the at least one post of the first user in response to determining that the second user is identified by the at least one post of the first user; and
- recording, using the processor, information associated with the first user in a data store in response to identifying that the first user has the link posted in the at least one post, wherein the information includes, at least in part, identification of the first user.

8. The computer program product of claim 7 wherein identifying the first user includes monitoring an associated second website profile of the first user.

9. The computer program product of claim 7 further comprising identifying a posting of the second user responding to the at least one post of the first user.

10. The computer program product of claim 9 wherein identifying the posting of the second user responding to the at least one post of the first user includes receiving the posting of the second user responding to the at least one post of the first user.

11. The computer program product of claim 9 further comprising:
- organizing, using the processor, the at least one post of the first user and the posting of the second user responding to the at least one post of the first user; and
- providing, using the processor, the organized at least one post of the first user and the posting of the second user responding to the at least one post of the first user for display by the website.

12. The computer program product of claim 7 wherein the link is a shortened Uniform Resource Locator (URL).

13. A computing system including a processor and memory configured to perform operations comprising:

providing, using the processor, at least a portion of text that includes a link for use by a website;

monitoring, using the processor, a plurality of posts associated with a second website to determine whether the link is present in at least one post of the plurality of posts;

identifying, using the processor, a first user of the second website that has the link included in the at least one post in response to identifying that the first user has the link posted in the at least one post;

determining, using the processor, that a second user of the second website is identified in the at least one post of the first user, wherein the second user is identified by name in the at least one post;

monitoring, using the processor, an associated second website profile of the second user identified by the at least one post of the first user in response to determining that the second user is identified in the at least one post of the first user; and recording, using the processor, information associated with the first user in a data store in response to identifying that the first user has the link posted in the at least one post, wherein the information includes, at least in part, identification of the first user.

14. The computing system of claim 13 wherein identifying the first user includes monitoring an associated second website profile of the first user.

15. The computing system of claim 13 further comprising identifying a posting of the second user responding to the at least one post of the first user.

16. The computing system of claim 15 wherein identifying the posting of the second user responding to the at least one post of the first user includes receiving the posting of the second user responding to the at least one post of the first user.

17. The computing system of claim 15 further comprising:

organizing, using the processor, the at least one post of the first user and the posting of the second user responding to the at least one post of the first user; and providing, using the processor, the organized at least one post of the first user and the posting of the second user responding to the at least one post of the first user for display by the website.

18. The computing system of claim 13 wherein the link is a shortened Uniform Resource Locator (URL).

* * * * *